US009103917B2

(12) United States Patent
Murray et al.

(10) Patent No.: US 9,103,917 B2
(45) Date of Patent: Aug. 11, 2015

(54) METHOD AND SYSTEM FOR DETERMINING LOCATION WITHIN A BUILDING BASED ON HISTORICAL LOCATION INFORMATION

(75) Inventors: Dave Murray, Mission Viejo, CA (US); Charles Abraham, Los Gatos, CA (US); Mark Buer, Gilbert, AZ (US); David Garrett, Tustin, CA (US); Jeyhan Karaoguz, Irvine, CA (US); David Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 738 days.

(21) Appl. No.: 12/748,010

(22) Filed: Mar. 26, 2010

(65) Prior Publication Data

US 2011/0207471 A1    Aug. 25, 2011

Related U.S. Application Data

(60) Provisional application No. 61/306,639, filed on Feb. 22, 2010.

(51) Int. Cl.
*G01S 19/49* (2010.01)
*H04W 64/00* (2009.01)

(52) U.S. Cl.
CPC ............... *G01S 19/49* (2013.01); *H04W 64/00* (2013.01)

(58) Field of Classification Search
CPC ....................................................... G01S 19/49
USPC ........................................................ 701/434
See application file for complete search history.

(56) References Cited

U.S. PATENT DOCUMENTS

2003/0225893 A1* 12/2003 Roese et al. .................. 709/227
2011/0087431 A1* 4/2011 Gupta et al. .................. 701/207

* cited by examiner

*Primary Examiner* — Maceeh Anwari
(74) *Attorney, Agent, or Firm* — Sterne, Kessler, Goldstein & Fox P.L.L.C.

(57) ABSTRACT

A mobile device may be operable to receive historical location trail information of a building. A location of the mobile device within the building may be determined by placing, moving or snapping a reference location of the mobile device onto a trail according to the received historical location trail information. The historical location trail information may be acquired from a location server. The historical location trail information stored in the location server may be generated using a plurality of location samples that are provided by one or more other mobile devices that have been within the building. The historical location trail information may also be acquired from an indoor map of the building that is used by the mobile device for navigation within the building. The determined location of the mobile device may then be utilized by the mobile device to navigate within the building for location-based services.

15 Claims, 4 Drawing Sheets

METHOD AND SYSTEM FOR DETERMINING LOCATION WITHIN A BUILDING BASED ON HISTORICAL LOCATION INFORMATION

CROSS-REFERENCE TO RELATED APPLICATIONS/INCORPORATION BY REFERENCE

This patent application makes reference to, claims priority to, and claims benefit from U.S. Provisional Application Ser. No. 61/306,639, which was filed on Feb. 22, 2010.

This application makes reference to: U.S. Provisional Application Ser. No. 61/305,174 filed on Feb. 17, 2010; U.S. patent application Ser. No. 12/732,986 filed on Mar. 26, 2010; U.S. Provisional Application Ser. No. 61/304,253 filed on Feb. 12, 2010; and U.S. patent application Ser. No. 12/748,240 filed on Mar. 26, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for determining location within a building based on historical location information.

BACKGROUND OF THE INVENTION

Location-based services (LBS) are emerging as a new type of value-added service provided by mobile communication network. LBS are mobile services in which the user location information is used in order to enable various LBS applications such as, for example, enhanced 911 (E-911), location-based 411, location-based messaging and/or location-based friend finding services. A location of a mobile device may be determined in different ways such as, for example, using network-based technology, using terminal-based technology, and/or hybrid technology, which is a combination of the former technologies. Many positioning technologies such as, for example, time of arrival (TOA), observed time difference of arrival (OTDOA), enhanced observed time difference (E-OTD) as well as the global navigation satellite system (GNSS) such as GPS, GLONASS, Galileo, Compass, and/or assisted-GNSS (A-GNSS), may be utilized to estimate the location (latitude and longitude) of the mobile device and convert it into a meaningful X, Y coordinate for LBS applications. A-GNSS technology combines satellite positioning and communication networks such as mobile networks to reach performance levels allowing the wide deployment of Location-Based Services.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for determining location within a building based on historical location information, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for determining location within a building based on historical location information. In various embodiments of the invention, a mobile device may be operable to receive historical location trail information of a building. The mobile device may be operable to acquire or request the historical location information. In some embodiments of the invention, the historical location information may be communicated to the mobile device whenever it is needed or upon the occurrence of one or more events. A location of the mobile device within the building may be determined by the mobile device based on a reference location of the mobile device and the received historical location trail information. In this regard, the location of the mobile device may be determined by moving, placing or snapping the reference location of the mobile device onto a trail according to the acquired historical location trail information. In one embodiment of the invention, the mobile device may be operable to acquire the historical location trail information from, for example, a location server. The historical location trail information stored in the location server may be generated using a plurality of location samples within the building. The location samples may be provided by one or more other mobile devices that have been within the building. In another embodiment of the invention, the mobile device may be operable to acquire the historical location trail information from, for example, an indoor map of the building where the indoor map is used by the mobile device for navigation within the building. The indoor map may be acquired by the mobile device from, for example, the Internet.

The reference location of the mobile device may be received from, for example, one or more RF network devices within the building. The reference location of the mobile device may also be received from one or more RF communication devices that are within proximity of the mobile device. The reference location of the mobile device may also be acquired by the mobile device, for example, using one or more motion sensors in the mobile device. The determined location of the mobile device may then be utilized by the mobile device to navigate within the building, for example, for location-based services (LBS).

Figure 1:
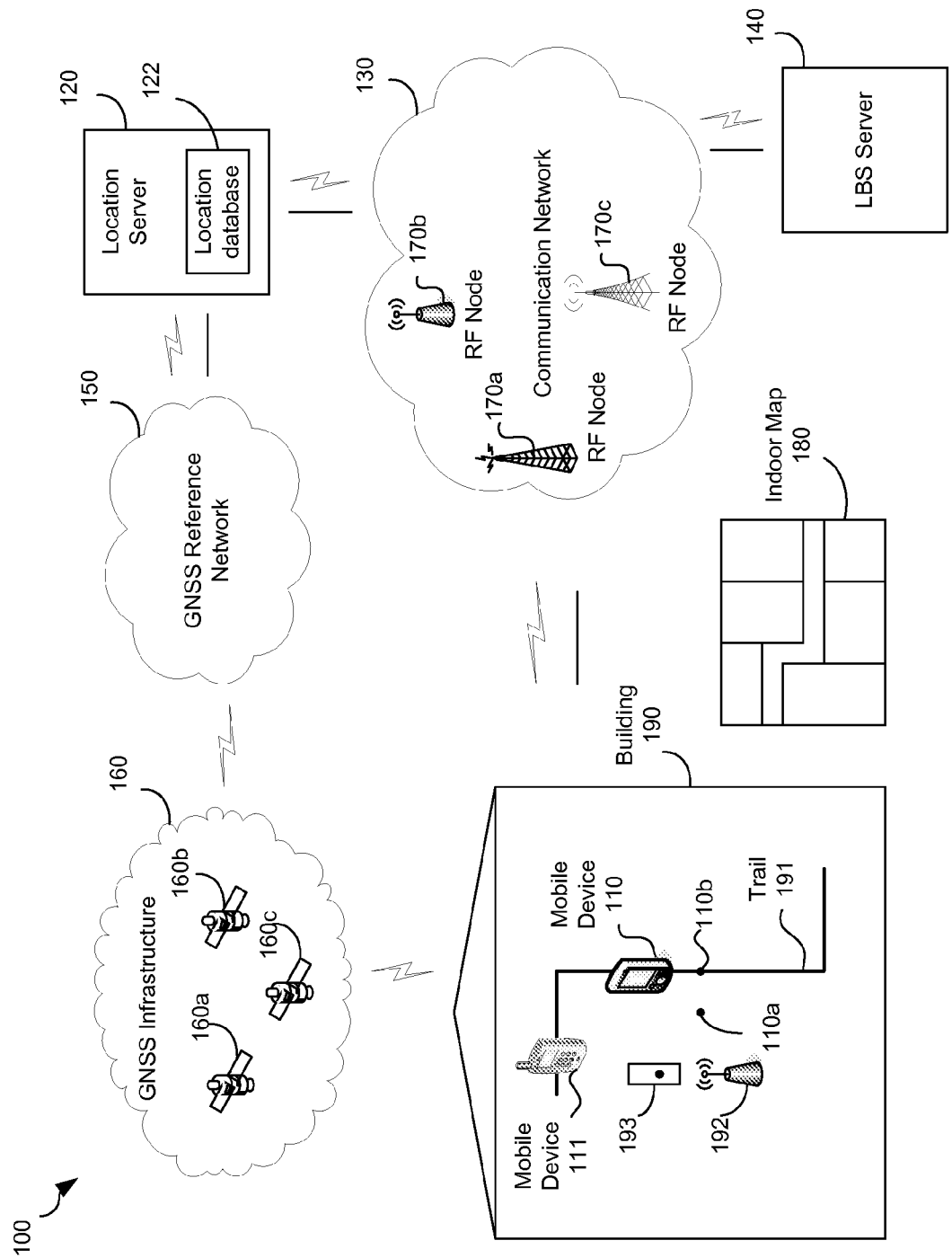
FIG. 1 is a block diagram illustrating an exemplary communication system that is operable to determine a location of a mobile device within a building based on historical location information, in accordance with an embodiment of the invention.

FIG. 1 is a block diagram illustrating an exemplary communication system that is operable to determine a location of a mobile device within a building based on historical location information, in accordance with an embodiment of the invention. Referring to FIG. 1, there is shown a communication system 100. The communication system 100 comprises mobile devices 110 and 111 within a building 190, an indoor map 180, a location server 120 comprising a location database 122, a communication network 130, a LBS server 140, a GNSS reference network 150 and a GNSS infrastructure 160. The communication network 130 may comprise a plurality of RF nodes, of which RF nodes 170a-170c are illustrated. The GNSS infrastructure 160 may comprise a plurality of GNSS satellites, of which GNSS satellites 160a-160c are illustrated. Also shown within the building 190 are a RF network device 192 and a RF communication device 193.

Each of the mobile devices 110, 111 such as the mobile device 110 may comprise suitable logic, circuitry, interfaces and/or code that may be operable to communicate radio signals across the communication network 130, for example, via the RF nodes 170a-170c. The mobile device 110 may be operable to, for example, receive GNSS broadcast signals from a plurality of visible GNSS satellites such as GNSS satellites 160a-160c in the GNSS infrastructure 160. In an exemplary embodiment of the invention, the mobile device 110 may be operable to receive historical location trail information of the building 190. A location such as the location 110b of the mobile device 110 may be determined by the mobile device 110 based on a reference location of the mobile device 110 such as the location 110a and the received historical location trail information. In this regard, the location 110b of the mobile device 110 may be determined by moving, placing or snapping the reference location such as the location 110a of the mobile device 110 onto a trail that is close by, for example the trail 191, according to the received historical location trail information. For example, the trail 191 may indicate a possible path such as a hallway or corridor within the building 190 based on the historical location trail information. The reference location such as the location 110a of the mobile device 110 may be an approximate location acquired from various resources. By moving, placing or snapping the location 110a to the location 110b on the trail 190, which may indicate a hallway, the mobile device 110 may be identified as at the location 110b in the hallway rather than, for example, in a wall.

In one embodiment of the invention, the mobile device 110 may be operable to acquire the historical location trail information from, for example, the location server 120. The historical location trail information stored in the location server 120 may be generated using a plurality of location samples within the building 190. In an exemplary embodiment of the invention, the historical location trail information may be stored in the location database 122 in the location server 120. The plurality of location samples may be provided by one or more other mobile devices that have been within the building 190 such as, for example, the mobile device 111. In another embodiment of the invention, the mobile device 110 may be operable to acquire the historical location trail information from, for example, the indoor map 180 of the building 190 where the indoor map 180 is used by the mobile device 110 for navigation within the building 190. The indoor map 180 may be acquired by the mobile device 110 from, for example, the Internet via the communication network 130.

The reference location such as the location 110a of the mobile device 110 may be acquired by the mobile device 110, for example, using one or more RF network devices such as the RF network device 192. For example, the RF network device 192 may comprise a wireless access point (AP) or a Bluetooth device that communicates with the mobile device 110. In this regard, the reference location such as the location 110a may be obtained or estimated from a known location of the RF network device 192. The reference location such as the location 110a may be acquired by the mobile device 110, for example, using one or more RF communication devices such as the RF communication device 193 that are within proximity of the mobile device 110. The RF communication device 193 may comprise, for example, a radio-frequency identification (RFID) device or a near field communication (NFC) device that communicates with the mobile device 110 whenever the mobile device 110 is within proximity of the RF communication device 193. In this regard, the reference location such as the location 110a may be obtained or estimated from a known location of the RF communication device 193. The reference location such as the location 110a of the mobile device 110 may also be acquired by the mobile device 110, for example, using one or more motion sensors in the mobile device 110. For example, the mobile device 110 may comprise an accelerometer, a gyroscope and/or an altimeter. The mobile device 110 may use, for example, an initial GNSS location and one or more of these motion sensors to calculate a reference location such as the location 110a of the mobile device 110, via dead reckoning (DR). The dead reckoning (DR) is a process of estimating a current reference location based upon a previously determined location or position fix, and advancing that location or position fix based upon known or estimated speeds over elapsed time, and course. The initial GNSS location of the mobile device 110 may be measured, for example, using GNSS signals from the GNSS satellites 160a-160c and/or GNSS assistance data (A-GNSS data) from the location server 120.

The determined location such as the location 110b of the mobile device 110 may then be utilized by the mobile device 110 to navigate within the building 190, for example, for location-based services (LBS).

The location server 120 may comprise suitable logic, circuitry, interfaces and/or code that may be operable to access the GNSS reference network 150 to collect GNSS satellite data by tracking GNSS constellations through the GNSS reference network 150. The location server 120 may be operable to utilize the collected GNSS satellite data to generate GNSS assistance data (A-GNSS data) comprising, for example, ephemeris data, long term orbit (LTO) data, reference positions and/or time information. The location server 120 may be operable to collect and/or retrieve location information or data from associated users such as the RF nodes 170a-170c and/or the mobile device 111. The received location data may be stored in the location database 122 so that it may be shared among associated mobile devices such as the mobile device 110. The location server 120 may be operable to communicate the stored location data as A-GNSS data to the mobile device 110, when need.

In an exemplary embodiment of the invention, the historical location trail information of the building 190 may be stored in the location database 122 in the location server 120. The historical location trail information of the building 190 may be received from a mobile device such as the mobile device 111 which has been within the building 190. The historical location trail information of the building 190 may be used by a mobile device such as the mobile device 110 that is within the building 190 to determine a location.

The communication network 130 may comprise suitable logic, circuitry, interfaces and/or code that may be operable to provide voice and data services to various mobile devices such as the mobile devices 110, 111 by using wireless and/or wired communication technologies such as, for example, WCDMA, UMTS, HSDPA, CDMA, EV-DO, GSM, GPRS, EDGE, EGPRS, LTE, Bluetooth, WiMAX, WiFi, FM, mobile TV and Ethernet. The communication network 130 may be operable to provide communication among the location server 120, the LBS server 140 and a plurality of served mobile devices such as the mobile devices 110, 111. The communication network 130 may comprise a plurality of RF nodes such as, for example, the RF nodes 170a-170c. The RF node 170a is a RF network device that may comprise, for example, a cell station, a wireless access point (AP) and/or a FM station.

The LBS server 140 may comprise suitable logic, circuitry, interfaces and/or code that may be operable to provide location based services (LBS). The LBS server may be operable to retrieve information such as, for example, local hotel addresses or a map of the vicinity of areas of interest. The LBS server 140 may be operable to communicate the retrieved information with various communication devices such as the mobile device 110 based on an associated position or location.

The GNSS reference network 150 may comprise suitable logic, circuitry, interfaces and/or code that may be operable to collect and/or distribute data for GNSS satellites 160a-160c on a continuous basis. The GNSS reference network 150 may comprise a plurality of GNSS reference tracking stations or receivers located around the world to provide A-GNSS coverage all the time in both a home network and/or any visited network. The GNSS reference network 150 may be communicatively coupled to the location server 120. The collected GNSS data or information may be utilized by the location server 120 to enhance LBS performance.

Each of the GNSS satellites 160a-160c such as the satellite 160a may comprise suitable logic, circuitry, interfaces and/or code that may be operable to generate and broadcast satellite navigational information. The broadcast satellite navigation information may be collected by the mobile devices 110, 111, for example. The broadcast satellite navigational information may be collected by the GNSS reference network 150 to be utilized by the location server 120 to enhance LBS performance. The GNSS satellites 160a-160c may comprise, for example, GPS, GLONASS, Galileo and/or Compass satellites.

In operation, the mobile device 110 may be operable to receive historical location trail information of the building 190 from, for example, the location server 120 and/or the indoor map 180 that is used by the mobile device 110. The location 110b of the mobile device 110 may be determined by the mobile device 110 based on the reference location 110a and the received historical location trail information. In this regard, the location 110b of the mobile device 110 may be determined by moving, placing or snapping the reference location 110a of the mobile device 110 onto the trail 191 according to the received historical location trail information. The historical location trail information stored in the location database 122 in the location server 120 may be generated using a plurality of location samples within the building 190. The plurality of location samples may be provided by other mobile devices that have been within the building 190 such as the mobile device 111.

The reference location 110a of the mobile device 110 may be acquired by the mobile device 110, for example, using the RF network device 192 with a known location. The RF network device 192 may comprise, for example, a wireless AP or a Bluetooth device that communicates with the mobile device 110. In this regard, the reference location 110a may be obtained or estimated from the known location of the RF network device 192. The reference location 110a may be acquired by the mobile device 110, for example, using the RF communication device 193 with a known location that is within proximity of the mobile device 110. The RF communication device 193 may comprise, for example, a RFID device or a NFC device that communicates with the mobile device 110 whenever the mobile device within proximity of the RF communication device 193. In this regard, the reference location 110a may be obtained or estimated from the known location of the RF communication device 193. The reference location 110a of the mobile device 110 may also be acquired by the mobile device 110, for example, using one or more motion sensors in the mobile device 110 such as, for example, an accelerometer, a gyroscope and/or an altimeter. The mobile device 110 may use, for example, an initial GNSS location and one or more of these motion sensors to calculate the reference location 110a of the mobile device 110, utilizing dead reckoning (DR).

The determined location 110b of the mobile device 110 may then be utilized by the mobile device 110 to navigate within the building 190, for example, for location-based services (LBS).

Figure 2:
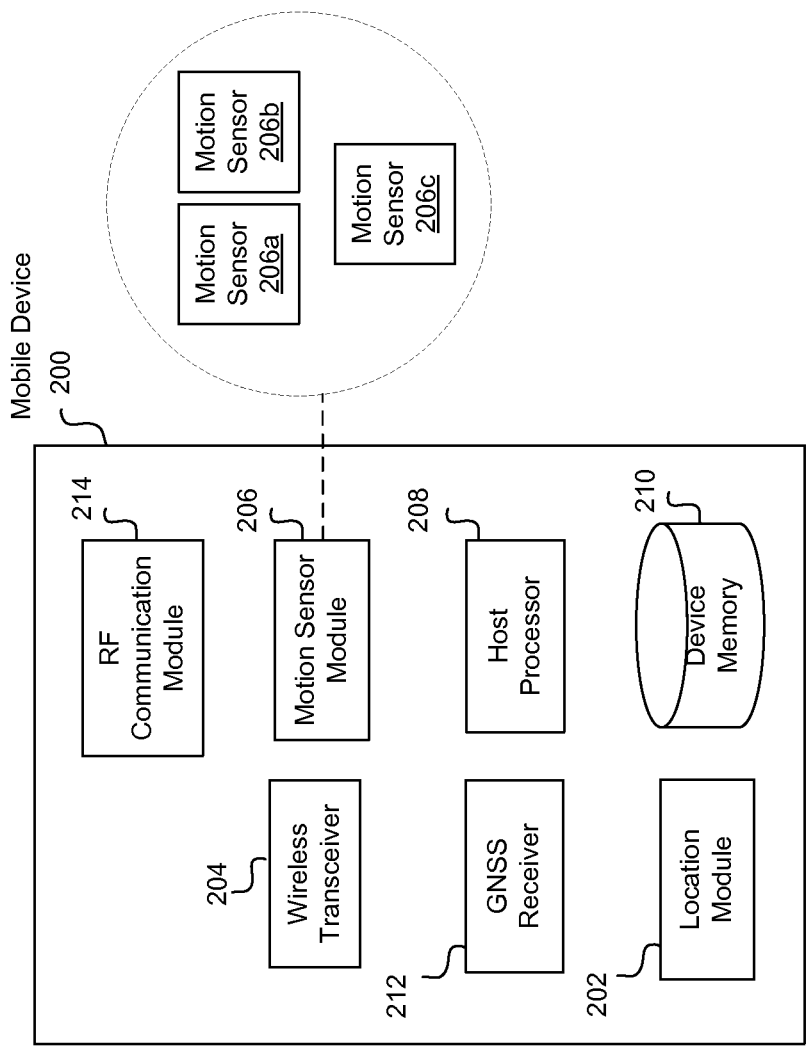
FIG. 2 is a block diagram illustrating an exemplary mobile device that is operable to determine a location of a mobile device within a building based on historical location information, in accordance with an embodiment of the invention.

FIG. 2 is a block diagram illustrating an exemplary mobile device that is operable to determine a location of a mobile device within a building based on historical location information, in accordance with an embodiment of the invention. Referring to FIG. 2, there is shown a mobile device 200. The mobile device 200 may comprise a location module 202, a wireless transceiver 204, a motion sensor module 206, a host processor 208, a device memory 210, a GNSS receiver 212 and a RF communication module 214.

The location module 202 may comprise suitable logic, circuitry, interfaces and/or code that may be operable to determine a location of the mobile device 200. In an exemplary embodiment of the invention, the location module 202 may be operable to acquire historical location trail information of the building 190 from, for example, the location server 120 via the wireless transceiver 204 and/or from the indoor map 180 that is used by the mobile device 200 within the building 190. The location 110b of the mobile device 200 within the building 190 may be determined by the location module 202 based on the reference location 110a of the mobile device 200 and the acquired historical location trail information. In this regard, for example, the location 110b of the mobile device 200 may be determined by moving, placing or snapping the reference location 110a of the mobile device 200 onto the trail 191 according to the acquired historical location trail information.

The reference location 110a of the mobile device 200 may be acquired by the location module 202, for example, using the RF network device 192 with a known location. The RF network device 192 may comprise, for example, a wireless AP or a Bluetooth device that communicates with the mobile device 200 via the wireless transceiver 204. In this regard, the reference location 110a may be obtained or estimated from the known location of the RF network device 192. The reference location 110a may be acquired by the location module 202, for example, using the RF communication device 193 with a known location that is within proximity of the RF communication module 214. The RF communication device 193 may comprise, for example, a RFID device or a NFC device that communicates with the RF communication module 214 whenever the RF communication module 214 is within proximity of the RF communication device 193. In this regard, the reference location 110a may be obtained or estimated from the known location of the RF communication device 193. The reference location 110a of the mobile device 200 may also be acquired by the location module 202, for example, via one or more motion sensors 206a-206c in the motion sensor module 206 such as, for example, an accelerometer, a gyroscope and/or an altimeter. The location module 202 may use, for example, an initial GNSS location and one or more of the motion sensors 206a-206c in the motion sensor module 206 to calculate the reference location 110a of the mobile device 200, utilizing dead reckoning (DR). The initial GNSS location of the mobile device 200 may be measured, for example, using GNSS signals received by the GNSS receiver 212 from the GNSS satellites 160a-160c and/or using GNSS assistance data (A-GNSS data) from the location server 120.

The determined location 110b of the mobile device 200 may then be utilized by the host processor 208 to navigate within the building 190, for example, for location-based services (LBS).

The motion sensor module 206 may comprise suitable logic, circuitry, interfaces and/or code that may be operable to sense various motions or movements of the mobile device 200. The motion sensor module 206 may comprise one or more motion sensors 206a-206c such as, for example, an accelerometer, a gyroscope and/or an altimeter. In an exemplary embodiment of the invention, one or more motion sensors 206a-206c in the motion sensor module 206 may be used by the location module 202 to calculate a reference location such as the location 110a of the mobile device 200 within the building 190, utilizing dead reckoning (DR).

The RF communication module 214 may comprise suitable logic, circuitry, interfaces and/or code that may be operable to communicate with a RF communication device such as, for example, the RF communication device 193 within the building 190, whenever the RF communication device 193 is within proximate range using RF signals for the purposes of, for example, identification, tracking and/or exchange of data. The RF communication module 214 may comprise, for example, a RFID device and/or a NFC device. In an exemplary embodiment of the invention, the reference location 110a of the mobile device 200 may be obtained or estimated based on a known location of the RF communication device 193 by the location module 202, whenever the RF communication module 214 communicates with the RF communication device 193 within proximity of the RF communication module 214.

The GNSS receiver 212 may comprise suitable logic, circuitry, interfaces and/or code that may be operable to detect and receive GNSS signals from a plurality of visible GNSS satellites 160a-160c. The GNSS receiver 212 may be operable to utilize the received GNSS signals to calculate navigation information or solution such as a position fix and/or velocity of the GNSS receiver 212. The calculated navigation information may be provided to the host processor 208 to be communicated with the communication network 130 for various navigation applications such as, for example, location-based 411 and/or roadside assistance. In an exemplary embodiment of the invention, the calculated GNSS position fix or GNSS location may be utilized by the location module 202 to estimate or calculate the reference location 110a of the mobile device 200 within the building 190, via dead reckoning (DR) using the motion sensor module 206.

The wireless transceiver 204 may comprise suitable logic, circuitry, interfaces and/or code that may be operable to communicate radio signals over the communication network 130 using various wireless access technologies. The wireless transceiver 204 may be operable to communicate with the RF network device 192 within the building 190 such as, for example, a wireless AP or a Bluetooth device.

The host processor 208 may comprise suitable logic, circuitry, interfaces and/or code that may be operable to process signals from the wireless transceiver 204, the location module 202, the GNSS receiver 212, the RF communication module 214 and/or the motion sensor module 206. The host processor 208 may manage and/or control operations of the wireless transceiver 204, the location module 202, the GNSS receiver 212, the RF communication module 214 and/or the motion sensor module 206. The host processor 208 may be operable to communicate signals with the communication network 130 and/or the RF network device 192 via the wireless transceiver 204. The host processor 208 may also be operable to communicate navigation information with the communication network 130 for various location-based services such as E-911, location-based 411 and/or location-based messaging.

The device memory 210 may comprise suitable logic, circuitry, interfaces and/or code that may be operable to store information such as executable instructions, data and/or database that may be utilized by the host processor 208 and the location module 202. The device memory 210 may comprise RAM, ROM, low latency nonvolatile memory such as flash memory and/or other suitable electronic data storage.

In operation, the location module 202 may be operable to acquire historical location trail information of the building 190 from, for example, the location server 120 via the wireless transceiver 204 and/or from the indoor map 180 that is used by the mobile device 200 within the building 190. The location 110b of the mobile device 200 within the building 190 may be determined by the location module 202 based on the reference location 110a of the mobile device 200 and the acquired historical location trail information. In this regard, the location 110b of the mobile device 200 may be determined by moving, placing or snapping the reference location 110a of the mobile device 200 onto a trail that is close by, for example, the trail 191 according to the acquired historical location trail information. For example, the trail 191 may indicate a possible path such as a hallway or corridor within the building 190 based on the historical location trail information. The reference location such as the location 110a of the mobile device 200 may be an approximate location acquired from various resources. By moving, placing or snapping the location 110a to the location 110b on the trail 190, which may indicate a hallway, the mobile device 200 may be identified as at the location 110b in the hallway rather than, for example, in a wall.

The reference location 110a of the mobile device 200 may be acquired by the location module 202, for example, using the RF network device 192 with a known location. The RF network device 192 may communicate with the mobile device 200 via the wireless transceiver 204. In this regard, the reference location 110a may be obtained or estimated from the known location of the RF network device 192. The reference location 110a may be acquired by the location module 202, for example, using the RF communication device 193 with a known location that is within proximity of the RF communication module 214. The RF communication device 193 may communicate with the RF communication module 214 within proximity of the RF communication module 214. In this regard, the reference location 110a may be obtained or estimated from the known location of the RF communication device 193. The reference location 110a of the mobile device 200 may also be acquired by the location module 202, for example, via one or more motion sensors 206a-206c in the motion sensor module 206 such as, for example, an accelerometer, a gyroscope and/or an altimeter. The location module 202 may use, for example, an initial GNSS location and one or more of this motion sensors 206a-206c in the motion sensor module 206 to calculate the reference location 110a of the mobile device 200, utilizing dead reckoning (DR). The initial GNSS location of the mobile device 200 may be measured, for example, using GNSS signals received by the GNSS receiver 212 from the GNSS satellites 160a-160c and/or using GNSS assistance data (A-GNSS data) from the location server 120.

The determined location 110b of the mobile device 200 may then be utilized by the host processor 208 to navigate within the building 190, for example, for location-based services (LBS).

Figure 3:
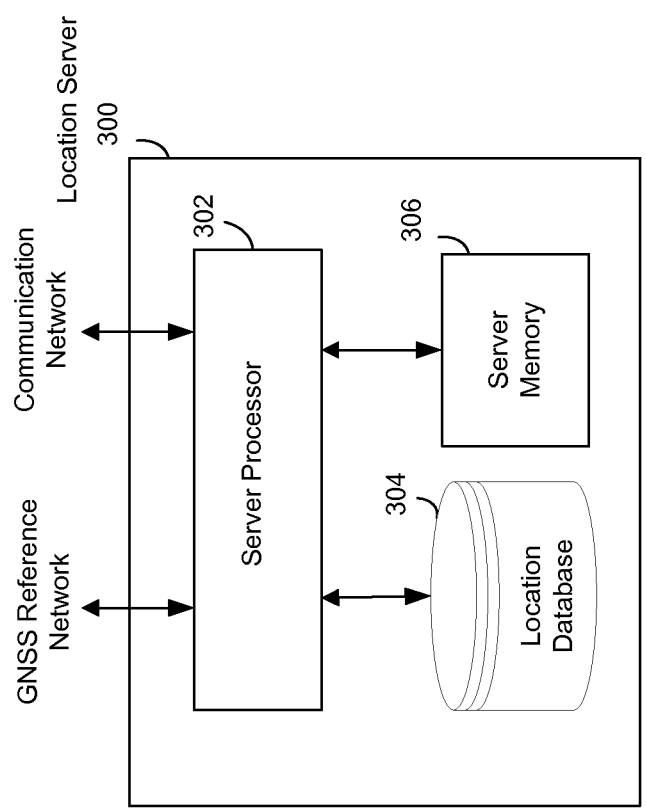
FIG. 3 is a block diagram illustrating an exemplary location server that is operable to determine a location of a mobile device within a building based on historical location information, in accordance with an embodiment of the invention.

FIG. 3 is a block diagram illustrating an exemplary location server that is operable to determine a location of a mobile device within a building based on historical location information, in accordance with an embodiment of the invention. Referring to FIG. 3, there is shown a location server 300. The location server 300 may comprise a server processor 302, a location database 304 and a server memory 306.

The server processor 302 may comprise suitable logic, circuitry, interfaces and/or code that may be operable to manage and/or control operations of the location database 304 and/or the server memory 306. The server processor 302 may be operable to communicate with the GNSS reference network 150 so as to collect GNSS satellite data by tracking GNSS constellations through the GNSS reference network 150. The server processor 302 may utilize the collected GNSS satellite data to build the location database 304, which may be coupled internally or externally to the location server 300. The server processor 302 may be operable to receive location information or data from associated users such as the mobile devices 110, 111. The received location information data may be stored in the location database 304 to share among associated users. In an exemplary embodiment of the invention, the server processor 302 may be operable to generate historical location trail information of the building 190 using a plurality of location samples within the building 190. The location samples may be received from one or more mobile devices which have been within the building 190 such as, for example, the mobile device 111. The generated historical location trail information may be stored in the location database 304. The stored historical location trail information may then be used, for example, by the mobile device 110 to determine the location 110b within the building 190.

The location database 304 may comprise suitable logic, circuitry, interfaces and/or code that may be operable to store location information of associated reference devices such as, for example, the RF nodes 170a-170c. The stored location information may be provided to associated communication devices such as the mobile device 110 to support LBS applications such as location-based access control. In an exemplary embodiment of the invention, the location database 304 may be operable to store the historical location information of the building 190 that is received from, for example, the mobile device 111.

The server memory 306 may comprise suitable logic, circuitry, interfaces and/or code that may be operable to store information such as executable instructions and data that may be utilized by the server processor 302 and/or other associated component units such as, for example, the location database 304. The server memory 306 may comprise RAM, ROM, low latency nonvolatile memory such as flash memory and/or other suitable electronic data storage.

In operation, the server processor 302 may be operable to generate historical location trail information of the building 190 using a plurality of location samples within the building 190. The location samples may be received from one or more mobile devices which have been within the building 190 such as, for example, the mobile device 111. The generated historical location trail information may be stored in the location database 304. The stored historical location trail information may then be used, for example, by the mobile device 110 to determine the location 110b within the building 190.

Figure 4:
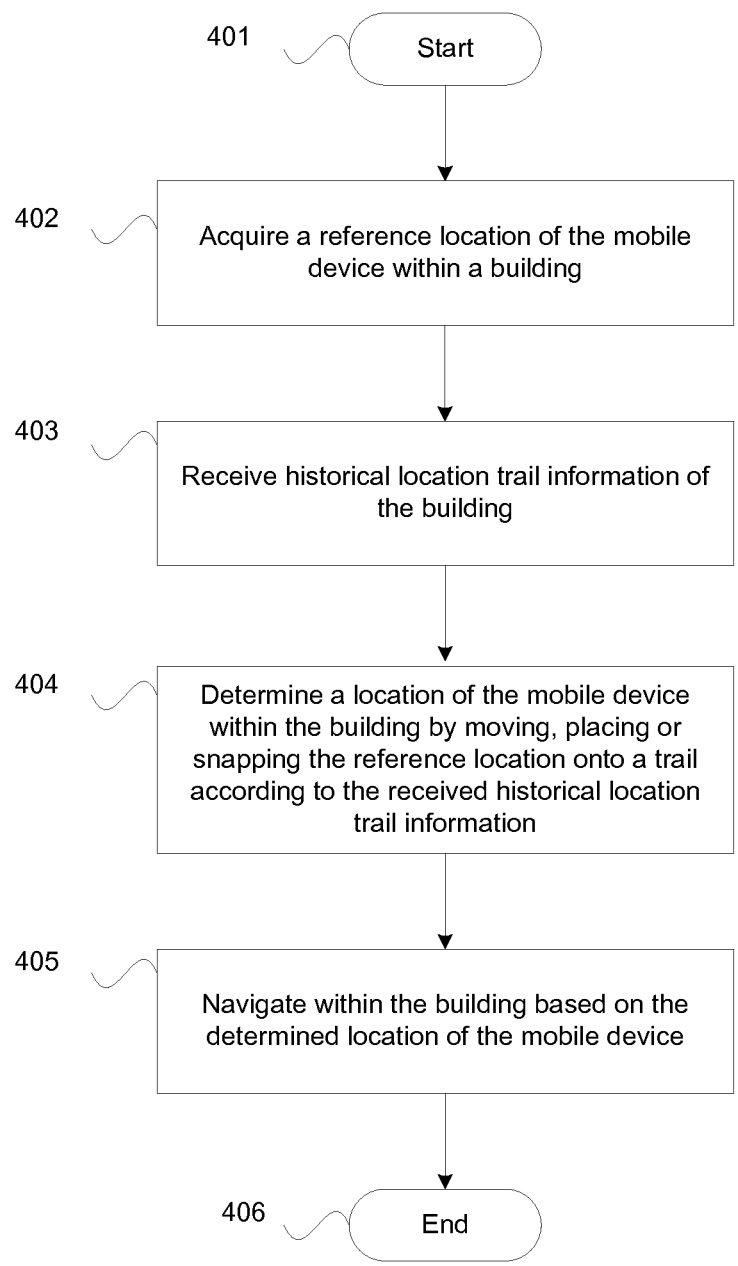
FIG. 4 is a flow chart illustrating exemplary steps for determining a location of a mobile device within a building based on historical location information, in accordance with an embodiment of the invention.

FIG. 4 is a flow chart illustrating exemplary steps for determining a location of a mobile device within a building based on historical location information, in accordance with an embodiment of the invention. Referring to FIG. 4, the exemplary steps start at step 401. In step 402, the location module 202 in the mobile device 200 may be operable to receive a reference location 110a of the mobile device 200 within a building 190. In step 403, the location module 202 in the mobile device 200 may be operable to acquire historical location trail information of the building 190, for example, from the location server 120 and/or from the indoor map 180 that is used by the mobile device 200 within the building 190. In step 404, the location module 202 in the mobile device 200 may be operable to determine a location 110b of the mobile device 200 by moving, placing or snapping the reference location 110a onto a trail 190 according to the received historical location trail information. In step 405, the mobile device 110 may be operable to navigate within the building 190 based on the determined location 110b of the mobile device 110, for example, for location-based services. The exemplary steps may proceed to the end step 406.

In various embodiments of the invention, a location module 202 in a mobile device 200 may be operable to receive historical location trail information of a building 190. The location module 202 in the mobile device 200 may be operable to acquire or request the historical location information. In some embodiments of the invention, the historical location information may be communicated to the mobile device 200 whenever it is needed or upon the occurrence of one or more events. A location 110b of the mobile device 110 within the building 190 may be determined by the location module 202 based on a reference location 110a of the mobile device 110 and the received historical location trail information. In this regard, the location 110b of the mobile device 110 may be determined by moving, placing or snapping the reference location 110a of the mobile device 110 onto a trail 191 according to the acquired historical location trail information. In one embodiment of the invention, the location module 202 may be operable to acquire the historical location trail information from, for example, a location server 120. The historical location trail information stored in the location server 120 may be generated using a plurality of location samples within the building 190. The plurality of location samples may be provided by one or more other mobile devices such as, for example, the mobile device 111 that has been within the building 190. In another embodiment of the invention, the location module 202 may be operable to acquire the historical location trail information from, for example, an indoor map 180 of the building 190 where the indoor map 180 is used by the mobile device 200 for navigation within the building 190.

The reference location 110a of the mobile device 200 may be received by the location module 202 from, for example, one or more RF network devices such as the RF network device 192 within the building 190. The reference location 110a of the mobile device 200 may be received from one or more RF communication devices such as the RF communication device 193, whenever the RF communication device 193 is within proximity of the RF communication module 214 in the mobile device 200. The reference location 110a of the mobile device 200 may also be acquired by the location module 202, for example, using one or more motion sensors 206a-206c in the mobile device 200. The determined location 110b of the mobile device 110 may then be utilized by the mobile device 110 to navigate within the building 190, for example, for location-based services (LBS).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining location within a building based on historical location information.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
   receiving historical location trail information of a building acquired from an indoor map of said building at a mobile device, wherein said historical location trail information comprises a trail;
   receiving a reference location of said mobile device using one or more radio frequency (RF) communication devices by acquiring said reference location of said mobile device using one or more RF network devices within said building;
   determining a location of said mobile device within said building based on said reference location and said received historical location trail information by placing said reference location of said mobile device onto said trail according to said received historical location trail information; and
   navigating within said building utilizing said indoor map.

2. The method according to claim 1, further comprising:
   acquiring, receiving, or requesting said historical location trail information from a location server.

3. The method according to claim 2, further comprising:
   generating said historical location trail information using a plurality of location samples within said building.

4. The method according to claim 3, wherein said generating comprises:
   providing said plurality of location samples by one or more other mobile devices that have been within said building.

5. The method according to claim 1, further comprising:
   acquiring said reference location of said mobile device using one or more motion sensors in said mobile device.

6. The method according to claim 1, wherein said navigating comprises:
   navigating within said building based on said determined location of said mobile device.

7. A system for communication, comprising:
   one or more processors or circuits for use in a mobile device, said one or more processors or circuits being configured to:
      receive historical location trail information of a building acquired from an indoor map of said building, wherein said historical location trail information comprises a trail;
      receive a reference location of said mobile device using one or more radio frequency (RF) communication devices by acquiring said reference location of said mobile device using one or more RF network devices within said building;
      determine a location of said mobile device within said building based on said reference location of said mobile device and said received historical location trail information by placing said reference location of said mobile device onto said trail according to said received historical location trail information; and
      navigate within said building utilizing said indoor map.

8. The system according to claim 7, wherein said one or more processors or circuits are further configured to acquire, receive or request said historical location trail information from a location server.

9. The system according to claim 8, wherein said historical location trail information is generated using a plurality of location samples within said building.

10. The system according to claim 9, wherein said plurality of location samples is provided by one or more other mobile devices that have been within said building.

11. The system according to claim 7, wherein said one or more processors or circuits are further configured to acquire said reference location of said mobile device using one or more motion sensors in said mobile device.

12. The system according to claim 7, wherein said one or more processors or circuits are further configured to navigate within said building based on said determined location of said mobile device.

13. The system according to claim 7, wherein said trail is generated using a plurality of location samples within said building.

14. A method for communication, comprising:
   receiving historical location trail information of a building acquired from an indoor map of said building at a mobile device, wherein said historical location trail information comprises a trail;
   receiving a reference location of said mobile device using one or more radio frequency (RF) communication devices by acquiring said reference location of said mobile device using one or more RF communication devices that are within a proximity of said mobile device;

determining a location of said mobile device within said building based on said reference location and said received historical location trail information by placing said reference location of said mobile device onto said trail according to said received historical location trail information; and navigating within said building utilizing said indoor map.

15. A system for communication, comprising:

one or more processors or circuits for use in a mobile device, said one or more processors or circuits being configured to:

receive historical location trail information of a building acquired from an indoor map of said building, wherein said historical location trail information comprises a trail;

receive a reference location of said mobile device using one or more radio frequency (RF) communication devices acquiring said reference location of said mobile device using one or more RF communication devices that are within a proximity of said mobile device;

determine a location of said mobile device within said building based on said reference location of said mobile device and said received historical location trail information by placing said reference location of said mobile device onto said trail according to said received historical location trail information; and navigate within said building utilizing said indoor map.

* * * * *

UNITED STATES PATENT AND TRADEMARK OFFICE
CERTIFICATE OF CORRECTION

PATENT NO. : 9,103,917 B2
APPLICATION NO. : 12/748010
DATED : August 11, 2015
INVENTOR(S) : Murray et al.

Page 1 of 1

It is certified that error appears in the above-identified patent and that said Letters Patent is hereby corrected as shown below:

In the Specification:

Column 13, Line 2. Please replace "within a proximity" with --within proximity--.

Column 13, Line 23. Please replace "within a proximity" with --within proximity--.

Signed and Sealed this
Twenty-third Day of August, 2016

Michelle K. Lee
*Director of the United States Patent and Trademark Office*